(12) United States Patent
Stroomer et al.

(10) Patent No.: US 7,627,852 B1
(45) Date of Patent: Dec. 1, 2009

(54) EMBEDDING AN INTERPRETER WITHIN AN APPLICATION WRITTEN IN A DIFFERENT PROGRAMMING LANGUAGE

(75) Inventors: Jeffrey D. Stroomer, Lafayette, CO (US); Roger B. Milne, Boulder, CO (US)

(73) Assignee: XILINX, Inc., San Jose, CA (US)

( * ) Notice: Subject to any disclaimer, the term of this patent is extended or adjusted under 35 U.S.C. 154(b) by 729 days.

(21) Appl. No.: 11/334,133

(22) Filed: Jan. 17, 2006

(51) Int. Cl.
G06F 9/44 (2006.01)
G06F 9/45 (2006.01)

(52) U.S. Cl. .................. 717/106; 717/112; 717/114

(58) Field of Classification Search ......... 717/106–115, 717/139, 140
See application file for complete search history.

(56) References Cited

U.S. PATENT DOCUMENTS

| | | | | |
|---|---|---|---|---|
| 4,905,138 | A * | 2/1990 | Bourne | 717/139 |
| 4,989,132 | A * | 1/1991 | Mellender et al. | 717/139 |
| 5,675,805 | A * | 10/1997 | Boldo et al. | 717/114 |
| 6,237,135 | B1 * | 5/2001 | Timbol | 717/107 |
| 6,292,933 | B1 * | 9/2001 | Bahrs et al. | 717/107 |
| 6,415,434 | B1 * | 7/2002 | Kind | 717/107 |
| 6,820,252 | B2 * | 11/2004 | Sakamoto et al. | 717/136 |
| 6,904,430 | B1 * | 6/2005 | Livshits | 707/6 |
| 6,968,538 | B2 * | 11/2005 | Rust et al. | 717/108 |
| 7,007,261 | B1 | 2/2006 | Ballagh et al. | |
| 7,010,779 | B2 * | 3/2006 | Rubin et al. | 717/106 |
| 7,076,486 | B2 * | 7/2006 | Livshits | 707/6 |
| 7,222,130 | B1 * | 5/2007 | Cras et al. | 707/103 R |
| 7,322,023 | B2 * | 1/2008 | Shulman et al. | 717/112 |
| 7,325,226 | B2 * | 1/2008 | Pepin et al. | 717/108 |
| 7,451,432 | B2 * | 11/2008 | Shukla et al. | 717/106 |
| 7,472,375 | B2 * | 12/2008 | Ye et al. | 717/106 |
| 7,493,313 | B2 * | 2/2009 | Kakivaya et al. | 707/3 |
| 7,516,440 | B2 * | 4/2009 | Upton | 717/106 |
| 7,539,688 | B2 * | 5/2009 | Sezgin et al. | 707/100 |

OTHER PUBLICATIONS

Ghazaleh et al, "Differential Deserialization for optimized SOAP performance", IEEE, p. 1-11, 2005.*
Marzouk et al, "A serialization based approach for strong mobility of shared object", ACM PPPJ, pp. 237-242, 2007.*
Diao et al, "Towards an internet scale XML dissemination service", ACM VLDB, pp. 612-623, 2004.*
Stepanian et al, "Inlining Java native calls at runtime", ACM VEE, pp. 121-131, 2005.*

(Continued)

*Primary Examiner*—Anil Khatri
(74) *Attorney, Agent, or Firm*—Kevin T. Cuenot (57) ABSTRACT

A method of accessing, from a host application written in a first programming language, a subroutine written in a second programming language can include serializing input data expressed as an XTable formatted in a first programming language into a string representation of the input data. The method further can include de-serializing the string representation of the input data as an XTable formatted in the second programming language and executing the subroutine, wherein the XTable formatted in the second programming language is processed as input. Output data returned from the subroutine that is expressed as an XTable formatted in the second programming language can be serialized into a string representation of the output data. The string representation of the output data can be de-serialized into an XTable formatted in the first programming language.

18 Claims, 2 Drawing Sheets

OTHER PUBLICATIONS

Wittmer, Kevin, "EPerl: Perl, C++, and Java", Jul. 2005, pp. 22-25, C/C== Users Journal, available from kevinwittme7@hotmail.com.

The Open Group, Unix, "Advanced Perl Programming", Embedding Perl: The Easy Way, Ch. 19, available at http://www.unix.org.ua/orelly/perl/advprog/ch19_02.htm or The Open Group, 44 Montgomery St., Suite 960, San Francisco CA 94104-4704, USA.

GSP Services, FreeBSD Man Pages, "PERLEMBED (1)", May 29, 2005, pp. 1-42, available at http://www.gsp.com/cgi-bin/man.cgi?section=1&topic=perlembed or GSP Services, 12635 Heming Ln, Bowie, MD 20716-1118 USA.

Jenness, Tim et al., "Extending and Embedding Perl", 2003, Complete Book, pp. 1-361, available from Manning Publications Co., 209 Bruce Park Avenue, Greenwich, CT 06830.

U.S. Appl. No. 11/268,918, filed Nov. 8, 2005, Jeffrey D. Stroomer et al., Xilinx, Inc., 2100 Logic Drive, San Jose, CA 95124.

U.S. Appl. No. 11/250,942, filed Oct. 14, 2005, Haibing, Ma et al., Xilinx, Inc., 2100 Logic Drive, San Jose, CA 95124.

U.S. Appl. No. 11/268,801, filed Nov. 8, 2005, Jonathan B. Ballagh et al., Xilinx, Inc., 2100 Logic Drive, San Jose, CA 95124.

"Introducing JSON", Nov. 2, 2006, pp. 1-5, available from http://json.org.

* cited by examiner

EMBEDDING AN INTERPRETER WITHIN AN APPLICATION WRITTEN IN A DIFFERENT PROGRAMMING LANGUAGE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to the field of computer programming and, more particularly, to embedding an interpreter for a programming language within an application written in a different programming language.

2. Description of the Related Art

Computer programs can be coded in any of a variety of different programming languages. Such is the case as each programming language typically is suited for a different type of task or function. For example, Perl, which stands for Practical Extraction and Reporting Language, is particularly well suited for processing and/or manipulating text. Programming languages such as C++ and Java® are object-oriented programming languages that are well suited for developing distributed application programs such as those commonly found on the Internet.

Due to the large number of available programming languages, it can be useful to augment an application written in one programming language with code that is written in a different programming language. One situation in which this may be desirable is the case where an application, written in a first programming language, requires a particular function that has already been solved or made available in a second programming language. For instance, if an application being developed in C++ requires a function that is commonly available in Perl, it can be useful extend the functionality of the C++ application by including the Perl subroutine within the C++ application rather than to recreate and/or rewrite the Perl subroutine in C++.

One technique for incorporating a subroutine within a high level language is to invoke the subroutine as a separate process from within the high level language application. Using this approach, a Perl script, for example, can be launched using a command such as "system( )" in the C++ programming language. The C++ application waits for the called Perl subroutine to complete execution. The exit status of the subroutine is then checked by the C++ application after execution to determine whether the Perl subroutine executed with any errors.

Use of the "system( )" command is one manner of incorporating a subroutine written in one programming language into an application written in a different programming language. This technique is relatively uncomplicated to implement. There are, however, some disadvantages. First, using a separate process to launch the subroutine is expensive in terms of execution time. Second, it is difficult to pass complex values from the application to the subroutine and to return complex values from the subroutine to the application. For these reasons, use of the "system( )" command to call any more than a few subroutines written in programming languages that are disparate from the host application is not practical.

Another technique for executing a subroutine from a host application is to embed an interpreter directly within the host application. For example, a Perl interpreter can be embedded within a C++ application. With this technique, the subroutine runs "in process" with less expense in terms of the computing resources required. There are, however, many different ways of embedding an interpreter within a host application. If the interactions between the host application and the subroutine are not complicated, embedding the interpreter typically is not difficult. If, however, the interactions between the host application and the subroutine are more involved, this technique can become a very complex endeavor.

It would be beneficial to provide a technique for accessing, from a host application, a subroutine written in a programming language that is different from that of the host application in a manner which overcomes the limitations described above.

SUMMARY

The present invention provides a solution for accessing and/or executing a subroutine within a heterogeneous software system. More particularly, the embodiments disclosed herein allow a subroutine that is written in a different programming language than the host application to be accessed and/or executed. Further, complex data structures can be being passed from a calling module within the host application to the subroutine; and, complex data structures can be returned from the subroutine to the calling module.

One embodiment of the present invention can include a method of accessing, from a host application written in a first programming language, a subroutine written in a second programming language. The method can include serializing input data expressed as an XTable formatted in a first programming language into a string representation of the input data and de-serializing the string representation of the input data as an XTable formatted in the second programming language. The subroutine can be executed such that the XTable formatted in the second programming language is processed as input. The method also can include serializing output data returned from the subroutine that is expressed as an XTable formatted in the second programming language into a string representation of the output data. The string representation of the output data can be de-serialized into an XTable formatted in the first programming language.

The method can include returning the output data expressed as an XTable formatted in the first programming language to a subroutine within the host application that was responsible for invoking the subroutine. A utility program can be dynamically generated. The utility program can be configured to perform the steps of de-serializing the string representation of the input data, executing the subroutine, and serializing output data returned from the subroutine.

In one embodiment, an interpreter can be invoked by passing a reference to the utility program which is stored as a file and the string representation of the input data. In another embodiment, the method can include encoding the utility program as a plain text string and passing the plain text string and the string representation of the input data to the interpreter. In any case, the interpreter can execute the utility program thereby calling the subroutine and de-serializing the string representation of the input data. It should be appreciated that each XTable can be passed as a single parameter.

Moreover, since an XTable can be a key/value map or a sequence, a single XTable is capable of containing several objects.

Another embodiment of the present invention can include a system for accessing a subroutine from within a host application written in a host programming language, wherein the subroutine is written in a subroutine programming language that is different from the host programming language. The system can include a gasket configured to translate data between a string representation of the data and an XTable representation of the data that is formatted using the host programming language.

The system further can include an interpreter embedded within the host application and a utility program. The interpreter can be configured to execute the utility program. The utility program can be dynamically generated by the gasket and coded in the subroutine programming language. The utility program also can be configured to translate data between the string representation of the data and an XTable representation of the data that is formatted using the subroutine programming language. The utility program can include a serialization module configured to translate an XTable returned from the subroutine and formatted in the subroutine programming language into a serialized string and a de-serialization module configured to translate a string into an XTable formatted in the subroutine programming language to be used by the subroutine as input when executed.

In one embodiment, the gasket can be configured to pass the interpreter a reference to the utility program stored in a file and the string representation of the data created by the gasket. In another embodiment, the gasket can pass the utility program formatted as a plain text string and the string representation the data from the gasket. Further, as noted, each XTable can be passed as a single parameter.

The interpreter can execute the utility program, thereby de-serializing the string representation of the data into the XTable representation of the data and calling the subroutine. The utility program can pass the XTable formatted in the subroutine programming language to the subroutine as a single parameter. The gasket also can include a serialization module configured to translate an XTable formatted in the host programming language into a serialized string and a de-serialization module configured to translate a string comprising output data from the subroutine into an XTable formatted in the host programming language.

Yet another embodiment of the present invention can include a machine readable storage, having stored thereon a computer program having a plurality of code sections for causing a machine to perform the various steps and implement the components and/or structures disclosed herein.

BRIEF DESCRIPTION OF THE DRAWINGS

There are shown in the drawings, embodiments which are presently preferred, it being understood; however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The present invention provides a solution for accessing a subroutine coded in a different programming language than is used to write the host application which accesses the subroutine. In accordance with the embodiments disclosed herein, an interpreter, configured to execute the subroutine, can be embedded in the host application. Data exchange between the subroutine and the host application is facilitated through the use of a data structure referred to as an XTable. An XTable can be used to convey information between software modules coded in different programming languages, i.e., among software modules of a heterogeneous software system as will be discussed herein. This allows complex data structures to be passed between the host application and the subroutine using relatively simple techniques typically reserved for passing single or less complex values.

The following is a discussion of XTables which will promote a better understanding of the embodiments described herein. An XTable refers to a data structure that is comprised of one or more data items. Each data item has a corresponding data type. The data types that may be included within an XTable may be limited to only those data types that have a natural internal representation in most modern programming languages.

The following rules define, generally, how an XTable is formed. An empty value can be an XTable. Primitive types such as Booleans, strings, integers, and real numbers can be XTables in and of themselves or can be included as data items within an XTable. A finite sequence, whether empty or non-empty, can be an XTable if each element of the sequence is itself an XTable. A key/value map, whether empty or non-empty, can be an XTable if each key is a defined primitive type, i.e., a string or the like, and each value is an XTable. Thus, as can be seen, the XTables can be recursive in nature as an element of an XTable itself can be considered an XTable.

As noted, the data types that may be used as, or within, an XTable may be limited to those which have natural internal representations in modern programming languages. Examples of such modern programming languages can include, but are not limited to, interpreted or scripted languages such as Practical Extraction and Report Language (Perl), Python, Java®, Tool Command Language (Tcl), and M-code from MATLAB®, as well as other programming languages which must be compiled such as C, C++, and the like. Limiting the available data types to those supported in most modern programming languages allows modules written in such programming languages to natively understand the element(s) of an XTable.

The particular manner in which an XTable is represented can vary with the programming language that is being used to manipulate the XTable. For example, in Perl, Python, and Java®, the empty value can be represented as "undef", "None", or "null" respectively. A sequence XTable can, but need not, be represented as a Perl array, a Python list, or a Java® ArrayList respectively. Similarly, a key/value map can be represented as a Perl hash table, a Python dictionary, or a Java® TreeMap. Other representations are possible; for example, in Java® a HashMap can be used instead of a TreeMap to represent a key/value map.

Table 1 below illustrates one example of an XTable.

TABLE 1

Perl XTable Example

```
{
    "key1" => "value1",
    "key2" => 1,
    "" = [1, 2, "three"]
}
```

The XTable illustrated in Table 1 is expressed using ordinary Perl syntax. The XTable comprises a key/value map consisting of three key/value pairs. The keys are the strings "key1", "key2", and " ", which is the empty string. The corresponding values are, respectively, the string "value1", the integer 1, and a sequence. All three values of the key/value map are themselves XTables. The sequence consists of the integers 1 and 2, and the string "three". Thus, the XTable is expressed using a syntactically correct Perl script. In this example, the braces "{" and "}" delimit a key/value map, while the symbol "=>" separates keys from values within the map. The symbols "[" and "]" delimit the sequence having values of "1, 2, 'three'".

Table 2 below expresses the same XTable using Python.

TABLE 2

Python XTable Example

```
{
    "key1": "value1",
    "key2": 1,
    "": [1, 2, "three"]
}
```

Table 3 below expresses the same XTable using Java®.

TABLE 3

Java XTable Example

```
TreeMap xt = new TreeMap( );
xt.put("key1", "value1");
xt.put("key2", new Integer(1));
ArrayList al = new ArrayList( );
al.add(new Integer(1));
al.add(new Integer(2));
al.add("three");
xt.put("", al);
```

An XTable can be rendered or represented in binary format or as human-readable text. The examples shown in Tables 1, 2, and 3 illustrate embodiments where the XTable has been converted into a human-readable format. When presented in human-readable format, the XTable can be represented using any of a variety of different programming languages whether interpreted or not. Accordingly, when the XTable of Table 1 is executed using an appropriate Perl interpreter, the result is a Perl representation of the XTable data structure.

In accordance with the embodiments disclosed herein, the application in which the interpreter is to be embedded, as well as the interpreter, may be augmented with functions capable of serializing and de-serializing XTables. Serialization and de-serialization allow an XTable expressed in native syntax for one programming language to be interpreted and manipulated in a second programming language. Such action requires parsing and compilation tools to be applied.

Figure 1:
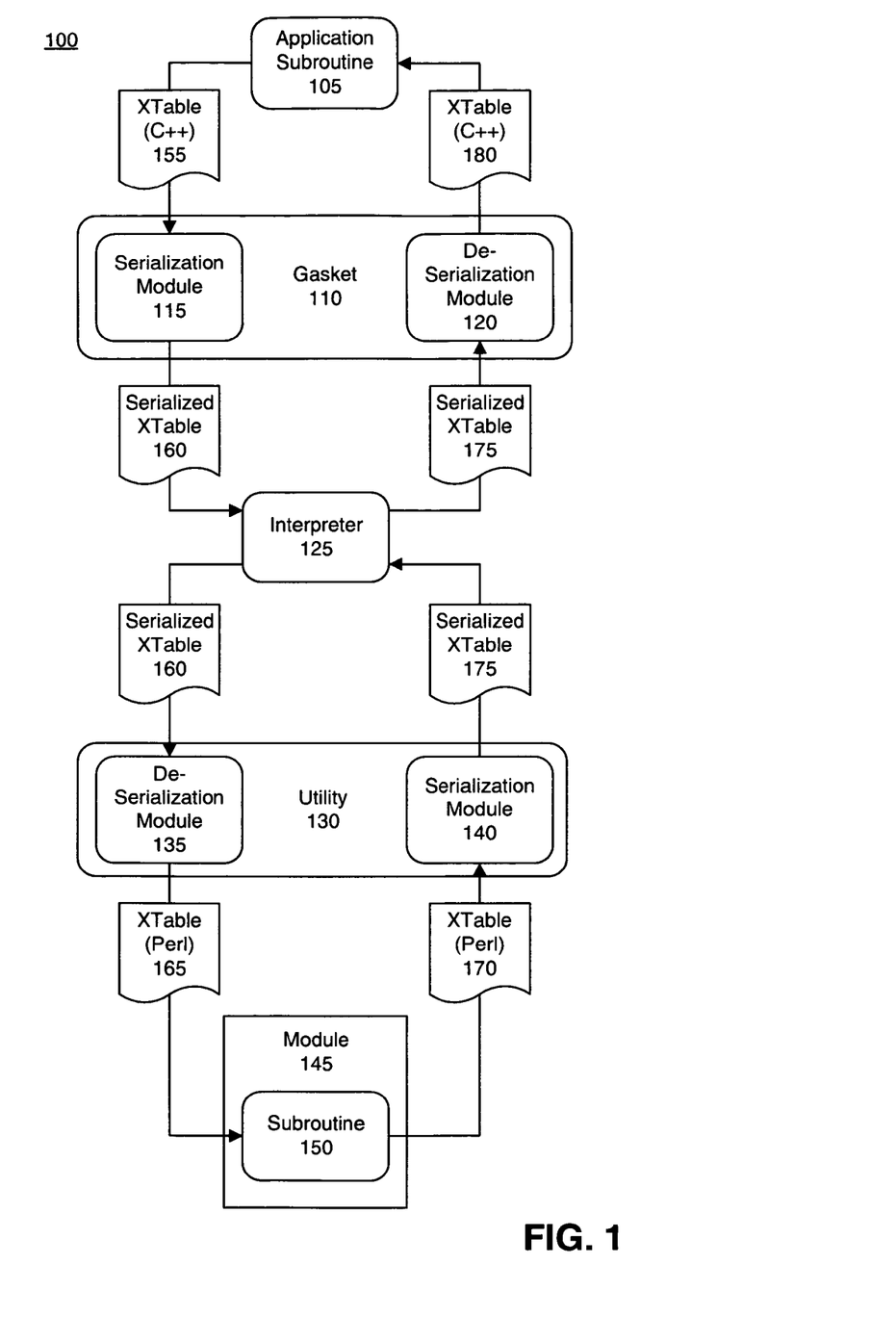
FIG. 1 is a schematic diagram illustrating a system for accessing a subroutine from a host application written in a different programming language in accordance with one embodiment of the present invention.

FIG. 1 is a schematic diagram illustrating a system 100 for accessing a program and/or subroutine 150 from a host application that is written in a different programming language in accordance with one embodiment of the present invention. In one embodiment, for example, a subroutine 105 of the host application may be written in a high level language such as C++ or Java®. Subroutine 150 may be written in a scripting language such as Perl, Python, or the like. In another embodiment, subroutine 105 may be written in a language such as Perl while subroutine 150 is written in a high level language such as C++ or Java®.

The particular programming language examples noted above are presented for purposes of illustration only. As such, it should be appreciated that the embodiments disclosed herein may be applied in any of a variety of cases where a calling subroutine within a host application calls another subroutine that is written in a different programming language than the host application. Accordingly, although FIG. 1 is described in the context of a subroutine 105 being written in C++ and calling a subroutine 150 written in Perl, these specific examples are used for purposes of illustration and clarity only.

FIG. 1 depicts various software components of a host application executing within a computing environment and the flow of information between such components. As shown, the host application may include subroutine 105 and a gasket 110. The host application, and thus subroutine 105 and gasket 110, may be written in a first programming language such as C++, while the module 145 and subroutine 150 disposed therein are written in a second and different programming language such as Perl. An interpreter 125, capable of executing subroutine 150 or programs written in Perl, may be embedded within the host application. The interpreter 125 also can be written in the same programming language as the host application.

To call subroutine 150, subroutine 105 first calls gasket 110. In doing so, subroutine 105 passes several pieces of information. In particular, subroutine 105 passes the name of module 145, which includes subroutine 150, a reference to the subroutine 150, as well as arguments that are to be provided to subroutine 150. The arguments that are provided are passed in the form of an XTable 155 as a single parameter. Since the XTable can be passed as a single argument, but specify complex data structures, it is less difficult to implement the passing of complex data. In this case, as subroutine 105 is coded in C++, the XTable 155 can be formatted using data structures that are native to C++ and that can be easily processed by subroutine 105.

Gasket 110 is configured to perform several functions for processing XTables. As shown, gasket 110 may include a serialization module 115 and a de-serialization module 120. Serializing and de-serializing facilitate communication among modules written in different programming languages. Serialization involves recursively processing an XTable. During serialization, elements or data items of the XTable are written in a fixed format to a data stream. The serialization can be either binary serialization or text serialization.

In the case of binary serialization, a binary data stream is generated from the XTable. The endianness and bit width of elementary data types are fixed. A unique format word, serving as a data type identifier, further can be written to the data stream prior to each data type. For composite data types, such as sequences and key-value maps, the format word is followed by an additional length word. For a sequence, the length word indicates the number of elements the sequence contains. For a key/value map, the length word indicates the number of key/value pairs. It should be appreciated, that the elements within a sequence, and the values within a key/value map can themselves be composite objects.

Text serialization is similar to that of binary serialization. One exception, however, is that special delimiter tokens may be used to format composite objects of the resulting data stream generated from the XTable. Whereas text serialization can be beneficial in cases where debugging is desired, binary serialization can be beneficial in cases where speed and compactness of representation are desired. In either case, because XTables support a small set of data types, and do not support pointers, serialization can be performed in a fast and efficient manner with the resulting string, or serialized XTable, having a small bit volume.

Accordingly, serialization module 115 can process XTable 155 to produce serialized XTable 160. The de-serialization module 120 can receive a serialized XTable and de-serialize the data stream to produce an XTable that is formatted according to the host programming language. In this manner, the gasket 110 can serialize an XTable passed by subroutine 105 which is to be provided to subroutine 150 as an argument and de-serialize results eventually received from subroutine 150 into an XTable that can be processed and/or understood by subroutine 105, i.e., one using C++ data structures.

Gasket 110 also generates a utility 130. The utility is created using the same programming language as module 145 and subroutine 150. In this case, utility 130 is coded in Perl. The utility 130 is tasked with several different functions. One function is to load module 145 and call subroutine 150. Utility 130 also includes a de-serialization module 135 and a serialization module 140. These modules function substantially as the de-serialization module 120 and the serialization module 115, respectively, described herein, with the exception that each is configured for use with the programming language used to code subroutine 150 and module 145. Thus, de-serialization module 135 takes a serialized XTable and de-serializes the XTable into an XTable that is formatted in Perl, i.e., an XTable using data structures or elements native to Perl. The serialization module 140 takes an XTable formatted in Perl, i.e., output from subroutine 150, and serializes that XTable into a serialized string.

Gasket 110 also calls the interpreter 125. When the interpreter 125 is called, the gasket 110 passes two values. The values include a reference to the utility 130 that was created as well as serialized XTable 160 that was output from serialization module 115. The interpreter 125 makes the serialized XTable available within the second programming language environment, i.e., within Perl, and calls the utility 130. The utility 130 loads the module and de-serializes serialized XTable 160 to produce XTable 165 which is formatted in Perl, i.e., a Perl XTable equivalent of XTable 155.

Subroutine 150 can run or execute and use XTable 165 as input. Results from execution of subroutine 150 can be provided as XTable 170, also formatted using Perl. XTable 170 is returned to the utility 130, where serialization module 140 serializes XTable 170 to produce serialized XTable 175. Serialized XTable 175 is returned to the interpreter 125, which in turn returns the serialized XTable 175 to the gasket 110. The de-serialization module 120 de-serializes the serialized XTable 175 into XTable 180. XTable 180 is formatted in C++, the host programming language, and therefore, is understandable by subroutine 105.

System 100 is provided as a high-level illustration of one embodiment of the present invention. As such, it is not intended to limit the present invention. That is, the various components described with reference to FIG. 1 are understood to be software modules or portions of code. Accordingly, the interaction and/or structure of such code may differ somewhat from the representative architecture presented in FIG. 1.

Figure 2:
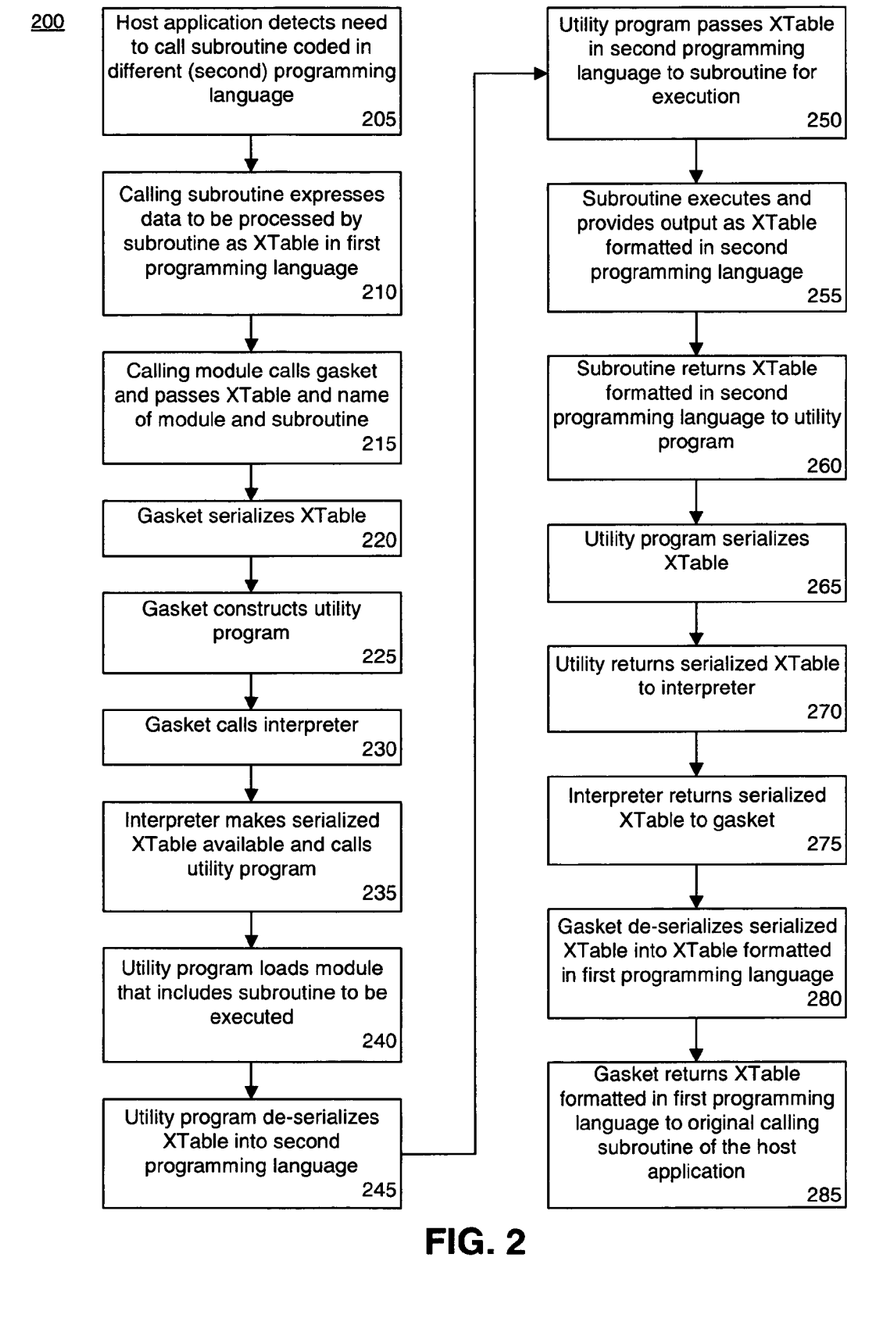
FIG. 2 is a flow chart illustrating a method of accessing a subroutine from a host application that is written in a different programming language in accordance with another embodiment of the present invention.

FIG. 2 is a flow chart illustrating a method 200 of accessing a subroutine from a host application that is written in a different programming language in accordance with another embodiment of the present invention. For purposes of illustration, method 200 assumes that the host application is written in C++ and that the subroutine being called is written in Perl. As noted, however, these examples are not to be construed as limitations as the embodiments described herein can be applied to different heterogeneous software systems having modules written in any of a variety of different programming languages.

Method 200 may be implemented using a system as described with reference to FIG. 1. Accordingly, method 200 can begin in a state where a host application written in C++ is executing. In step 205, the host application detects a need to call a subroutine written in a different programming language. As noted, it may be the case that a particular problem has already been solved in Perl. Rather than recreate the solution in C++, it may be desirable to incorporate the Perl solution into the C++ application. Thus, in step 205, a calling subroutine of the host application can determine that the functionality of a subroutine written in Perl is needed.

In step 210, the calling subroutine formats the data to be passed to the Perl subroutine as an XTable. Included in the XTable also can be the name of the Perl module that includes the Perl subroutine to be called, as well as the name of the Perl subroutine to be called. The XTable is comprised of data elements which are native to the C++ programming language. Due to the flexible nature of an XTable, the data to be passed to the subroutine can be formatted as a single XTable, which can accommodate complex data structures. In step 215, the calling module can call a gasket. In calling the gasket, the XTable, or a reference thereto, is provided as a single parameter. Passing the XTable as a single parameter simplifies the process of passing complex data among different subroutines, heterogeneous or not.

In step 220, the gasket serializes the XTable into a serialized string. In step 225, the gasket dynamically constructs a Perl program utility. The gasket also, in step 230, calls the interpreter. In one embodiment, in calling the interpreter, the gasket passes a name of, or a reference to, the Perl program utility just created as well as the serialized XTable. In that case, the Perl program utility can be written to, and executed from, a standalone file. In another embodiment, the Perl program utility can be expressed, or encoded, as a plain text string. This text string can be provided to the interpreter along with the serialized XTable.

In step 235, the interpreter makes the serialized XTable available within Perl and calls, or executes, the Perl program utility provided as a plain text string. In step 240, the Perl program utility loads the module that includes the Perl subroutine to be executed. In step 245, the Perl program utility de-serializes the serialized XTable, or at least the portion thereof that specifies input data to the subroutine, into a Perl XTable, i.e., an XTable that includes data items and/or structures native to Perl. Once de-serialized, the Perl program utility passes the Perl formatted XTable to the Perl subroutine as a single parameter or argument in step 250.

In step 255, the Perl subroutine executes and produces output that is formatted as a Perl XTable. The Perl subroutine returns the output to the Perl program utility in step 260. The Perl program utility, in step 265, serializes the Perl formatted XTable and returns the serialized XTable to the interpreter in step 270. The interpreter, in turn, returns the serialized XTable to the gasket in step 275. The gasket de-serializes the serialized XTable in step 280 to produce an XTable formatted in C++ and then returns the resulting XTable to the original calling subroutine of the host application in step 285.

The embodiments disclosed herein provide a solution for embedding an interpreter for a first programming language within a host application written in a second, or different, programming language. Using data structures referred to as XTables, along with a series of serialization and de-serialization operations performed upon the XTables, data can be passed as a single parameter between the host application and the subroutine. This technique allows complex data structures to be exchanged between disparate modules of a heterogeneous software system without incurring the overhead of a process launch.

The embodiments disclosed herein further allow complex data to be passed between modules and/or subroutines of different programming languages using relatively simple techniques. More particularly, rather than using the complex techniques provided by tools such as the Perl interpreter, for example, to pass complex data structures, less complicated method(s) used for passing a single string can be used to pass complex data values.

One or more embodiments of the present invention can be realized in hardware or a combination of hardware and software. One or more embodiments of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e., communicatively linked through a communication channel or pathway or another component or system.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of invoking, from a host application written in a first programming language, a subroutine written in a second programming language different from the first programming language, said method comprising:
   serializing input data expressed as a first XTable formatted in the first programming language and comprising a plurality of different data types native to the first programming language into a string representation of the input data stored in memory;
   de-serializing the string representation of the input data as a second XTable stored in memory and formatted in the second programming language, wherein the second XTable comprises a plurality of data types native to the second programming language, and wherein the second programming language is scripted;
   executing the subroutine, wherein the second XTable formatted in the second programming language is processed as input;
   serializing output data returned from the subroutine, expressed as a third XTable formatted in the second programming language and comprising a plurality of different data types native to the second programming language, into a string representation of the output data stored in memory; and
   de-serializing the string representation of the output data into a fourth XTable stored in memory and formatted in the first programming language, wherein the fourth XTable comprises data types native to the first programming language,
   wherein serializing input data, de-serializing the string representation, executing the subroutine, serializing output data, and de-serializing the string representation are performed and are executable by a computer, and wherein the steps of de-serializing the string representation, executing the subroutine, and serializing output data are performed by a utility program that is dynamically generated.

2. The method of claim 1, wherein the subroutine is a first subroutine, the method further comprising returning the output data expressed as the fourth XTable formatted in the first programming language to a second subroutine within the host application that was responsible for invoking the first subroutine.

3. The method of claim 1, further comprising invoking an interpreter that executes programs implemented in a scripted programming language by passing the interpreter the string representation of the input data and a reference to the utility program which is stored as a file.

4. The method of claim 1, further comprising:
   encoding the utility program as a plain text string; and
   passing the plain text string and the string representation of the input data to an interpreter that executes programs implemented in a scripted programming language.

5. The method of claim 4, further comprising the interpreter executing the utility program thereby calling the subroutine and de-serializing the string representation of the input data.

6. The method of claim 1, wherein each of the first, second, third, and fourth XTables is passed as a single parameter.

7. A system for accessing a subroutine from within a host application written in a host programming language, wherein the subroutine is written in a subroutine programming language that is different from the host programming language, said system comprising:

a computer executing program code that implements a plurality of components comprising:

a gasket executing in the computer configured to translate data between a string representation of the data stored in memory and a first XTable representation of the data stored in memory and formatted using the host programming language, wherein the first XTable comprises a plurality of data types native to the host programming language;

a utility program that is dynamically generated by said gasket and coded in the subroutine programming language, wherein said utility program is executed by the computer to translate between the string representation of the data and a second XTable representation of the data stored in memory and formatted using the subroutine programming language, wherein the second XTable comprises a plurality of data types native to the subroutine programming language; and an interpreter embedded within the host application, wherein said interpreter is operative within the computer to execute the utility program;

wherein said gasket provides said interpreter with said utility program and the string representation of the data, and wherein said interpreter executes said utility program within the computer, thereby de-serializing the string representation of the data and calling the subroutine.

8. The system of claim 7, wherein said utility program passes the subroutine the second XTable formatted in the subroutine programming language as a single parameter.

9. The system of claim 7, said gasket further comprising:

a serialization module configured to translate the first XTable formatted in the host programming language into the string representation of the data; and a de-serialization module configured to translate a string comprising output data from the subroutine into a third XTable formatted in the host programming language.

10. The system of claim 7, said utility program further comprising:

a serialization module configured to translate a third XTable returned from the subroutine and formatted in the subroutine programming language into a serialized string; and a de-serialization module configured to translate the string representation of the data into the second XTable formatted in the subroutine programming language to be used by the subroutine as input when executed.

11. The system of claim 7, wherein said gasket passes a reference to a file comprising said utility program.

12. The system of claim 7, wherein said gasket passes said utility program as a plain text string.

13. A computer readable storage, having stored thereon a computer program that, when executed by a computer, causes the computer to perform a method, comprising:

serializing input data expressed as a first XTable, formatted in a first programming language corresponding to a host application and comprising a plurality of different data types native to the first programming language, into a string representation of the input data stored in memory;

de-serializing the string representation of the input data as a second XTable stored in memory and formatted in a second programming language corresponding to a subroutine, the second programming language being different from the first programming language, wherein the second XTable comprises a plurality of data types native to the second programming language, and wherein the second programming language is scripted;

executing the subroutine, wherein the second XTable formatted in the second programming language is processed as input;

serializing output data returned from the subroutine, expressed as a third XTable, formatted in the second programming language and comprising a plurality of different data types native to the second programming language, into a string representation of the output data stored in memory; and de-serializing the string representation of the output data into a fourth XTable stored in memory and formatted in the first programming language, wherein the fourth XTable comprises data types native to the first programming language, wherein the steps of de-serializing the string representation of the input data, executing the subroutine, and serializing output data returned from the subroutine are performed by a utility program that is dynamically generated.

14. The computer readable storage of claim 13, wherein the subroutine is a first subroutine, further comprising returning the output data expressed as the fourth XTable formatted in the first programming language to a second subroutine within the host application that was responsible for invoking the first subroutine.

15. The computer readable storage of claim 13, further comprising invoking an interpreter that executes programs implemented in a scripted programming language by passing the string representation of the input data and a reference to the utility program which is stored as a file.

16. The computer readable storage of claim 13, further comprising:

encoding the utility program as a plain text string; and passing the plain text string and the string representation of the input data to an interpreter that executes programs implemented in a scripted programming language.

17. The computer readable storage of claim 16, further comprising causing the interpreter to execute the utility program thereby calling the subroutine and de-serializing the string representation of the input data.

18. The computer readable storage of claim 13, wherein each of the first, second, third, and fourth XTables is passed as a single parameter.

* * * * *

UNITED STATES PATENT AND TRADEMARK OFFICE
CERTIFICATE OF CORRECTION

PATENT NO.        : 7,627,852 B1                                      Page 1 of 1
APPLICATION NO. : 11/334133
DATED             : December 1, 2009
INVENTOR(S)       : Stroomer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

Signed and Sealed this

Second Day of November, 2010

David J. Kappos
*Director of the United States Patent and Trademark Office*